(12) United States Patent
Nakae

(10) Patent No.: US 9,076,480 B2
(45) Date of Patent: Jul. 7, 2015

(54) METHOD OF PRODUCING GLASS SUBSTRATE FOR INFORMATION RECORDING MEDIUM

(75) Inventor: Hazuki Nakae, Kyoto (JP)

(73) Assignee: Hoya Corporation, Tokyo (JP)

( * ) Notice: Subject to any disclaimer, the term of this patent is extended or adjusted under 35 U.S.C. 154(b) by 0 days.

(21) Appl. No.: 13/638,871

(22) PCT Filed: Mar. 15, 2011

(86) PCT No.: PCT/JP2011/001498
§ 371 (c)(1),
(2), (4) Date: Oct. 1, 2012

(87) PCT Pub. No.: WO2011/121913
PCT Pub. Date: Oct. 6, 2011

(65) Prior Publication Data
US 2013/0023185 A1    Jan. 24, 2013

(30) Foreign Application Priority Data
Mar. 29, 2010   (JP) ................... 2010-075325

(51) Int. Cl.
  *G11B 5/84*   (2006.01)
  *C03C 19/00*  (2006.01)
  *C09G 1/02*   (2006.01)

(52) U.S. Cl.
  CPC ........ *G11B 5/8404* (2013.01); *Y10T 428/24355* (2015.01); *C09G 1/02* (2013.01); *C03C 19/00* (2013.01)

(58) Field of Classification Search
  CPC ........... C03C 23/0075; C03C 2203/50; G11B 5/8404
  USPC ........... 428/846.9, 848.8; 501/63, 64, 69, 70; 65/30.13, 61; 451/28, 41; 216/31, 88, 216/97; 360/135
  See application file for complete search history.

(56) References Cited

U.S. PATENT DOCUMENTS

| | | | |
|---|---|---|---|
| 7,500,904 B2 | 3/2009 | Minami et al. | |
| 2001/0039810 A1* | 11/2001 | Eda et al. | 65/30.14 |
| 2001/0055938 A1 | 12/2001 | Fujimura et al. | |
| 2005/0202758 A1 | 9/2005 | Yoshida et al. | |
| 2005/0238927 A1 | 10/2005 | Horie et al. | |
| 2006/0140105 A1 | 6/2006 | Minami et al. | |
| 2007/0145014 A1* | 6/2007 | Nishimoto et al. | 216/97 |
| 2007/0167116 A1* | 7/2007 | Yoshida et al. | 51/308 |
| 2008/0220700 A1 | 9/2008 | Minami et al. | |
| 2009/0142626 A1 | 6/2009 | Orita et al. | |
| 2009/0158775 A1 | 6/2009 | Takizawa et al. | |
| 2009/0163117 A1 | 6/2009 | Horie et al. | |
| 2009/0203300 A1 | 8/2009 | Yoshida et al. | |
| 2010/0167091 A1* | 7/2010 | Tachiwana et al. | 65/30.14 |
| 2010/0190413 A1* | 7/2010 | Nishimoto et al. | 51/308 |
| 2013/0012104 A1* | 1/2013 | Yamaguchi et al. | 451/41 |
| 2013/0084386 A1* | 4/2013 | Yamaguchi et al. | 427/129 |

FOREIGN PATENT DOCUMENTS

| | | |
|---|---|---|
| GB | 2 375 116 | 11/2002 |
| JP | 2001-269858 | 10/2001 |
| JP | 2002-008223 | 1/2002 |
| JP | 2002-294225 | 10/2002 |
| JP | 2003-223711 | 8/2003 |
| JP | 2004-213716 | 7/2004 |
| JP | 2005-254351 | 9/2005 |
| JP | 2005-310324 | 11/2005 |
| JP | 2006-303136 | 11/2006 |
| JP | 2006-351081 | 12/2006 |
| JP | 2007-257810 | 10/2007 |
| JP | 2007-276041 | 10/2007 |
| JP | 2008-101132 | 5/2008 |
| JP | 2008-238287 | 10/2008 |
| JP | 2008-246645 | 10/2008 |
| JP | 2009-134802 | 6/2009 |

OTHER PUBLICATIONS

Office Action for corresponding Japanese Patent Application No. 2012-508051 with partial translation.

* cited by examiner

*Primary Examiner* — Kevin M. Bernatz
(74) *Attorney, Agent, or Firm* — Brinks Gilson & Lione

(57) ABSTRACT

Disclosed is a method of producing a glass substrate for an information recording medium including a precision polishing step of using a polishing material containing colloidal silica and performing precision polishing, under acidic conditions, on a glass material in which the amount of iron adhered on the surface is 0.5 ng/cm$^2$ or less and the surface roughness Ra is 1 nm or less. Additionally disclosed is a glass substrate for an information recording medium produced by the foregoing method of producing a glass substrate for an information recording medium.

7 Claims, No Drawings

METHOD OF PRODUCING GLASS SUBSTRATE FOR INFORMATION RECORDING MEDIUM

RELATED APPLICATIONS

This is a U.S. National Phase Application under 35 USC 371 of International Application PCT/JP2011/001498 filed on Mar. 15, 2011.
This application claims the priority of Japanese application no. 2010-075325 filed May 29, 2010, the entire content of both of which are hereby incorporated by reference.

TECHNICAL FIELD

The present invention relates to a method of producing a glass substrate for an information recording medium.

BACKGROUND ART

In recent years, demands for a glass substrate as the base material (substrate) of information recording mediums as represented by a magnetic hard disk drive are increasing.
In order to achieve a higher recording density of an information recording medium, the glass substrate as the substrate is subject to a plurality of polishing steps with a high degree of accuracy such as a rough polishing step, a precision polishing step, and so on. In the foregoing polishing steps, the glass material is demanded of high smoothness and high cleanliness, and the improvement of productivity is also demanded.
As a method of achieving high smoothness, known is the method of using silica-based abrasive grains in the final polishing step, and the cyclic use of the silica-based abrasive grains is known as the means for simultaneously improving the productivity (Patent Document 1). Note that, in the final polishing step, known is the use of a slurry (polishing solution with silica-based abrasive grains dispersed therein) added with a gelling inhibitor for the polishing process in order to prevent clumping of the slurry and gelling (Patent Document 2).
Patent Document 1: Japanese Patent Application Publication No. 2008-246645
Patent Document 2: Japanese Patent Application Publication No. 2008-101132

SUMMARY OF THE INVENTION

An object of this invention is to provide a method of producing a glass substrate for an information recording medium wherein, when cyclically using colloidal silica as the polishing material upon subjecting a glass material to precision polishing, limitation in the number of times that the colloidal silica can be cyclically used is avoided by preventing the gelling of the colloidal silica so as to improve the productivity.

In other words, a first aspect of the present invention is to comprise a precision polishing step of using a polishing material containing colloidal silica and performing a precision polishing under acidic conditions on a glass material in which an amount of iron adhered on a surface of the glass material is 0.5 ng/cm$^2$ or less and a surface roughness Ra of the glass material is 1 nm or less, using a polishing material containing colloidal silica.

Moreover, a second aspect of the present invention is a glass substrate for an information recording medium produced with the foregoing production method.

DETAILED DESCRIPTION OF PREFERRED EMBODIMENTS

In order to achieve the smoothness demanded in a glass substrate for an information recording medium, at the current moment, such smoothness can only be achieved based on precision polishing using colloidal silica. Most of the colloidal silica used in today's precision polishing has a grain size of 20 nm to 80 nm, and the colloidal silica is used for polishing while being dispersed with a dispersant or the like. Nevertheless, when iron (Fe), in particular trivalent ferric iron ($Fe^{3+}$) that dissolved from the glass material is contained in the polishing slurry, it is known that the colloidal silica becomes gelled due to such Fe or $Fe^{3+}$. Thus, when the colloidal silica is cyclically used as the polishing material, there is a problem in that, with the lapse of time, the colloidal silica becomes clumped in the form of a gel and can no longer be used as a polishing material.

As the means for resolving the foregoing problem, that is a technique of removing the clumped colloidal silica using a filter. Nevertheless, with this technique, there is a problem in that, when the clumped colloidal silica is finer than the filter, the colloidal silica passes through the filter, and is ineffective. Particularly in recent years, since colloidal silica of roughly 20 nm is often used, the clumped colloidal silica pass through the filter, and no effect is yielded. Meanwhile, if the filter pores are small, the clumped colloidal silica becomes clogged and cannot be processed. Consequently, the number of times that the polishing material can be cyclically used was limited to roughly three times, and there was a problem in that the production efficiency would deteriorate as a result thereof.

Meanwhile, even when the gelling inhibitor disclosed in Patent Document 2 is used, gelling cannot be inhibited upon actually performing the treatment. Thus, since there is no means for inhibiting the gelling of the colloidal silica, the number of times that the polishing material could be cyclically used was limited, and the productivity deteriorated.

As a result of intense study, the present inventor discovered that the foregoing gelling of the colloidal silica occurs when Fe is adhered to the glass material, and when $Fe^{3+}$ has dissolved from Fe. Since the Fe adhered to the glass material is dissolved while being in contact with the colloidal silica, it is considered that the $Fe^{3+}$ and the colloidal silica come into contact before being chelated, thereby causing the gelling of the colloidal silica. These tendencies become more prominent as the grain size of the colloidal silica becomes smaller. This is considered to be a result of the number of times that the colloidal silica comes into point contact with the glass material increasing as the grain size is smaller, thereby causing the number of times that the colloidal silica and $Fe^{3+}$ come into contact to increase, and consequently inducing gelling.

Meanwhile, the precision polishing step is preferably performed under acidic conditions in order to increase the polishing rate and improve the productivity. This is because, under neutral conditions, the smoothness will deteriorate since the polishing material is not dispersed. Moreover, under alkali conditions, the substrate and the polishing material do not come into contact since the dispersion force is too strong, and the polishing performance will deteriorate. Nevertheless, in a polishing environment under acidic conditions, since the dissolution of iron is also promoted upon using colloidal silica, the foregoing problems become even more notable.

Based on the findings described above, the present invention was devised in foregoing problems.

The preferred embodiments and examples of the present invention are now explained. Nevertheless, the present invention is not limited to the production methods of the ensuing embodiments and examples.

The glass substrate for an information recording medium according to this embodiment is used, for example, as a circular base material (substrate) suitable for a magnetic hard disk as an information recording medium. The production process of the glass substrate includes a step of forming a circular disk-shaped glass material via press working and drilling process, a lapping step, a polishing step, a post-polishing washing step, and a precision polishing step, and is completed after performing a washing step.

As the glass material, preferably used is a material containing 3.6 mass % of $Li_2O$, 11.2 mass % of $Na_2O$, 0.4 mass % of $K_2O$, 0.6 mass % of MgO, 1.6 mass % of CaO, 14.9 mass % of $Al_2O_3$, 64.5 mass % of $SiO_2$, 2.0 mass % of $ZrO_2$, 0.5 mass % of $CeO_2$, and 0.7 mass % of $SnO_2$.

[Lapping Step]

The circular glass material molded via press working is subject to grinding work using a relatively coarse diamond grindstone. This lapping step may be performed once, and is preferably performed twice. Moreover, when the lapping step is performed a plurality of times, a rough polishing step is performed in between so as to remove the scratches and strains remaining from the lapping step.

[Polishing Step]

(Rough Polishing Step)

The glass material is polished with a double-sided polishing machine by using cerium oxide after the lapping step. With the foregoing double-sided polishing machine, DLC coating treatment is preferably performed to the entire surface. DLC is short for diamond-like carbon, and is used for protecting the surface of the polishing machine, and completely preventing the adhesion of iron.

(Post-Polishing Washing Step)

The glass material is preferably washed after the polishing step. In this post-polishing washing step, a washing tank made of polyvinyl chloride (PVC) is used for preventing the intrusion of iron.

As an example of the post-polishing washing step of the present invention, the glass material is preferably washed with an alkali detergent of pH 13, and thereafter rinsed. Subsequently, the glass material is preferably washed with an acid-based detergent (nitric acid) of pH 0, thereafter rinsed, and ultimately washed with HF (0.1% solution).

In relation to cerium oxide, washing is performed most efficiently in the order of alkali washing, acid washing, and HF. This is because the polishing material can be first dispersed and removed with the alkali detergent, the polishing material can be subsequently dissolved and removed with the pickling agent, and the polishing material that is deeply stuck in the glass, as a result of etching the glass, can be ultimately removed with the HF. Moreover, the respective detergents are degassed prior to use, and washing is performed while applying ultrasonic waves. As a result of degassing the detergents, it becomes possible to remove the cerium oxide that is strongly adhered to the glass material. Moreover, as a result of using ultrasonic waves, the cavitation effect will increase, and the dispersion effect by the alkali detergent will consequently increase. The application conditions are as follows; namely, 40 kHz with an alkali detergent, 80 kHz with a pickling agent, and 170 kHz with an HF detergent. In particular, by applying ultrasonic waves of 80 kHz when using a pickling agent, the solubility of small adhesions can be improved. Finally, ultrasonic waves of 170 kHz are preferably applied when using HF. Here, even finer cerium oxide can be removed.

(Precision Polishing Step)

Next, in the precision polishing step, the same polishing machine that was used in the foregoing rough polishing step is used upon changing the polishing pad from a hard polishing pad to a soft polishing pad. The treatment that is performed in this precision polishing step is a mirror polishing treatment of obtaining a smooth mirror finish in which the maximum height (Rmax) of the surface roughness of the main surface is, for example, roughly 6 nm or less while maintaining the flat and smooth main surface obtained in the foregoing rough polishing step. As the polishing material, preferably used is a polishing material containing colloidal silica having an average grain size of 20 nm in which the grain size is smaller than the cerium-based polishing material used in the rough polishing step. A polishing solution (slurry) containing the foregoing polishing material is supplied to the glass material, the polishing pad and the glass material are caused to relatively slide, and the surface of the glass material is thereby subject to mirror polishing.

The precision polishing is preferably performed at pH 0.8 to pH 2.0. As a result of performing the precision polishing in the foregoing pH range, the $\xi$ potential can be favorably applied.

In other words, the $\xi$ potential needs to be applied in order to increase the dispersibility of the polishing material. Generally speaking, the $\xi$ potential can be applied more under higher acidic conditions (lower pH), or under higher alkali conditions (higher pH). Meanwhile, if the pH is too low, this is undesirable since rust from the machine may increase or damage on the substrate may remain.

[Final Washing Step]

The final washing step of the glass material that was subject to the foregoing precision polishing step is performed as follows.

Foremost, without drying the glass material that was subject to the precision polishing step, the glass material is stored in water and transported to the subsequent washing step in a wet state. This is because, if the glass material in a state of containing polishing residue is dried, it becomes difficult to remove the polishing material (colloidal silica) in the final washing step.

Accordingly, the polishing material needs to be removed without damaging the surface of the mirror-polished glass material. For example, in the case of a wash solution that has an etching effect or a leaching effect on the glass material, the mirror-polished glass surface is damaged by the foregoing wash solution, and becomes a finished surface of a pear skin pattern. With this kind of finished surface of a pear skin pattern, it is not possible to sufficiently reduce the floating quantity of the magnetic head. Accordingly, preferably used as the wash solution is a type that does not have an etching effect or a leaching effect on the glass material, and which is of a composition comprising selective solubility relative to the colloidal silica. In other words, it is preferable to select a wash solution having a composition that does not include hydrofluoric acid (HF), hydrofluosilicic acid ($H_2SiF_6$) or the like which causes the etching of the glass. The glass substrate is produced after going through the washing step.

EXAMPLES

The Examples of the present invention are now explained, and compared with the Comparative Examples. Note that, in the following explanation, the surface roughness Ra is the arithmetic average roughness of a 5 μm (vertical)×5 μm (horizontal) square area of the main surface of the glass substrate that was subject to washing treatment, and is a result of observing ten glass substrates using an atomic force microscope (AFM).

(Glass Composition)

The following were prepared as the composition of the glass material.

TABLE 1

|  | Li$_2$O | Na$_2$O | K$_2$O | MgO | CaO | Al$_2$O$_3$ | SiO$_2$ | ZrO$_2$ | CeO$_2$ | SnO$_2$ | TOTAL |
|---|---|---|---|---|---|---|---|---|---|---|---|
| GLASS COMPOSITION (MASS %) | 3.6 | 11.2 | 0.4 | 0.6 | 1.6 | 14.9 | 64.5 | 2.0 | 0.5 | 0.7 | 100.0 |

Example 1

A lapped glass raw board was washed in a hydrofluoric acid (HF) solution of 0.1 mass %, and thereafter subject to a polishing step with a double-sided polishing machine using cerium oxide. The double-sided polishing machine used in the polishing step was a type in which the entire surface was subject to DLC coating treatment.

Washing was performed after the foregoing polishing step. A PVC-type washing tank was used, and washing was performed in the order of neutral detergent, deionized water, deionized water, and IPA. The surface roughness Ra after the washing process was 0.4 nm.

The colloidal silica having an average grain size of 20 nm was thereafter formed into a slurry, and treatment was performed using a double-sided polishing machine in which the entire surface was subject to DLC coating treatment. Here, the pH was set to 1.0. In order to confirm how many times the slurry could be cyclically used, whether the surface roughness Ra changed upon continuously performing cyclic use was evaluated. The pH after 20 cyclic uses was 1.9.

Example 2

The processes of Example 1 were similarly completed up to the polishing step, and the post-polishing washing step was performed in the order of HF solution of 0.1 mass %, neutral detergent, deionized water, deionized water, and IPA. The surface roughness Ra after the washing process was 0.6 nm. The colloidal silica having an average grain size of 20 nm was thereafter formed into a slurry, and treatment was performed using a double-sided polishing machine. Here, the pH was set to 0.8. In order to confirm how many times the slurry could be cyclically used, whether the surface roughness Ra changed upon continuously performing cyclic use was evaluated. The pH after 20 cyclic uses was 1.8.

Example 3

The processes of Example 1 were similarly completed up to the polishing step, and the post-polishing washing step was performed in the order of HF solution of 0.1 mass %, sulfuric acid, alkali detergent, deionized water, and IPA. The surface roughness Ra after the washing process was 0.9 nm. The colloidal silica having an average grain size of 20 nm was thereafter formed into a slurry, and treatment was performed using a double-sided polishing machine. Here, the pH was set to 1.0. In order to confirm how many times the slurry could be cyclically used, whether the surface roughness Ra changed upon continuously performing cyclic use was evaluated. The pH after 20 cyclic uses was 1.9.

Example 4

The processes of Example 1 were similarly completed up to the polishing step, and the post-polishing washing step was performed in the order of HF solution of 0.1 mass %, neutral detergent, deionized water, deionized water, and IPA. The surface roughness Ra after the washing process was 0.6 nm. The colloidal silica having an average grain size of 20 nm was thereafter formed into a slurry, and treatment was performed using a double-sided polishing machine. Here, the pH was set to 1.0. In order to confirm how many times the slurry could be cyclically used, whether the surface roughness Ra changed upon continuously performing cyclic use was evaluated. The pH after 20 cyclic uses was 1.9.

Example 5

The processes of Example 1 were similarly completed up to the polishing step, and the post-polishing washing step was performed in the order of HF solution of 0.1 mass %, neutral detergent, deionized water, deionized water, and IPA. The surface roughness Ra after the washing process was 0.9 nm. The colloidal silica having an average grain size of 20 nm was thereafter formed into a slurry, and treatment was performed using a double-sided polishing machine. Here, the pH was set to 1.0. In order to confirm how many times the slurry could be cyclically used, whether the surface roughness Ra changed upon continuously performing cyclic use was evaluated. The pH after 20 cyclic uses was 1.9.

Comparative Example 1

After the completion of the lapping step, the glass raw board was washed with a general pickling agent, processed with a double-sided polishing machine that was not subject to DLC coating, and washed in the order of neutral detergent, deionized water, deionized water, and IPA. The surface roughness Ra after the washing process was 0.4 nm. The colloidal silica having an average grain size of 20 nm was thereafter formed into a slurry, and treatment was performed using a double-sided polishing machine. Here, the pH was set to 1.0. In order to confirm how many times the slurry could be cyclically used, whether the surface roughness Ra changed upon continuously performing cyclic use was evaluated. The pH after 20 cyclic uses was 1.9.

Comparative Example 2

The processes of Example 1 were similarly completed up to the polishing step, and the post-polishing washing step was performed in the order of HF solution of 2.0 mass %, sulfuric acid (5 N), alkali-based detergent, deionized water, and IPA. The surface roughness Ra after the washing process was 1.2 nm. The colloidal silica having an average grain size of 20 nm was thereafter formed into a slurry, and treatment was performed using a double-sided polishing machine. Here, the pH was set to 1.0. In order to confirm how many times the slurry could be cyclically used, whether the surface roughness Ra changed upon continuously performing cyclic use was evaluated. The pH after 20 cyclic uses was 1.9.

(Evaluation Method)

In the respective Examples 1 to 5 and Comparative Examples 1 and 2, the number of times that the colloidal silica can be cyclically used in the precision polishing step was evaluated based on the Fe content and surface roughness Ra.

As the method of verifying the Fe content, the Fe adhesion amount (Q) ng/cm² of the obtained glass substrate surface was measured using a standard Inductively Coupled Plasma-Mass Spectrometer (ICP-MS) (7700 series manufactured by Agilent Technologies), and the average value of ten glass substrates was computed.

Moreover, the slurry was cyclically used 15 times in the precision polishing step, and the quality in the 5th use, 7th use, and 15th use was evaluated in the four levels of Very good, Good, Fair, and Poor. The evaluation was performed based on the surface roughness Ra in the respective cyclic uses (5th use, 7th use, 15th use). The surface roughness Ra was evaluated by observing ten glass substrates using an atomic force microscope (AFM) manufactured by Veecco.
Very good: Average of the surface roughness Ra is 0.03 nm or more and less than 0.1 nm.
Good: Average of the surface roughness Ra is 0.1 nm or more and less than 0.15 nm.
Fair: Average of the surface roughness Ra is 0.15 nm or more and less than 0.2 nm.
Poor: Average of the surface roughness Ra is 0.2 nm or more.

TABLE 2

|  | Fe CONTENT (ng/cm²) | EVALUATION UPON PREDETERMINED NUMBER OF CYCLICALLY USES | | |
|---|---|---|---|---|
|  |  | 5TH CYCLIC USE | 7TH CYCLIC USE | 20TH CYCLIC USE |
| EXAMPLE 1 | 0.43 | VERY GOOD | VERY GOOD | GOOD |
| EXAMPLE 2 | 0.23 | VERY GOOD | VERY GOOD | VERY GOOD |
| EXAMPLE 3 | 0.20 | VERY GOOD | VERY GOOD | GOOD |
| EXAMPLE 4 | 0.23 | VERY GOOD | VERY GOOD | VERY GOOD |
| EXAMPLE 5 | 0.20 | VERY GOOD | VERY GOOD | GOOD |
| COMPARATIVE EXAMPLE 1 | 1.30 | POOR | POOR | POOR |
| COMPARATIVE EXAMPLE 2 | 0.21 | FAIR | FAIR | FAIR |

As evident from Table 2, with Examples 1 to 5 in which a polishing material containing colloidal silica was used and precision polishing was performed, under acidic conditions, on a glass material in which an amount of iron adhered on a surface of the glass material is 0.5 ng/cm2 or less and a surface roughness Ra of the glass material is 1 nm or less, superior evaluation results were obtained even when the slurry was cyclically used 15 times in the precision polishing step. Meanwhile, with Comparative Example 1 in which the amount of iron adhered on the surface was 1.3 ng/cm2, the evaluation was inferior regardless of the number of times that the slurry was used cyclically. In addition, even when the amount of iron adhered on the surface of the glass substrate was 0.5 ng/cm2 or less, Comparative Example 2 in which the surface roughness of the glass substrate surface before the precision polishing step was 1.2 nm, the evaluation was slightly inferior to foregoing Examples 1 to 5.

Note that the foregoing embodiments merely illustrated preferred specific examples of the present invention, and the present invention is not limited to the foregoing Examples. Accordingly, it goes without saying that the production method of eliminating iron from the glass material to be used in the precision polishing step of using a polishing material containing colloidal silica and performing precision polishing, under acidic conditions, on a glass material in which an amount of iron (Fe, $Fe^{3+}$) adhered on the surface of the glass material is 0.5 ng/cm² or less, or causing the amount of iron (Fe, $Fe^{3+}$) adhered on the surface of the glass material to be 0.5 ng/cm² or less no later than before the precision polishing step may be variously modified within the scope of claims of the present invention.

While the present specification discloses the various embodiments of technology as described above, the main technologies thereof can be summarized as follows.

The present invention is a method of producing a glass substrate for an information recording medium comprising a precision polishing step of performing a precision polishing under acidic conditions on a glass material in which an amount of iron adhered on a surface of the glass material is 0.5 ng/cm² or less and a surface roughness Ra of the glass material is 1 nm or less, using a polishing material containing colloidal silica.

In this embodiment, since the Fe content (iron, ferric iron) on the glass material surface used in the precision polishing step is extremely low, it is possible to fully inhibit the gelling of the colloidal silica. Accordingly, it is possible to use colloidal silica of a small grain size, increase the number of times that the colloidal silica can be cyclically used, and thereby improve the productivity. Moreover, if a large amount of iron is adhered to the glass material, the adhered Fe gets deeply stuck in the glass material due to the polishing machine (colloidal silica). Thus, the adhered Fe cannot be removed in the subsequent washing process and the like. Meanwhile, in the present invention, since the Fe content on the glass material surface used in the precision polishing step is extremely low, the Fe content adhered to the polished glass material will also decrease, and there is an advantage in that the cleanliness and smoothness of the glass substrate can be improved. Moreover, in the present invention, since the Fe content on the glass material surface used in the precision polishing step is extremely low, polishing can be performed under relatively strong acidic conditions. In addition, it is possible to favorably apply the ξ potential and increase the dispersibility of the polishing material, and obtain a fine-grained polished surface.

Moreover, in the present invention, the Fe content on the glass material surface used in the precision polishing step is extremely low. Thus, even when the polishing material containing the colloidal silica is cyclically used under acidic conditions upon performing precision polishing, the number of times that the colloidal silica can be cyclically used can be maintained high, and a significant effect is yielded in that the productivity can be dramatically improved.

In a preferred embodiment, the precision polishing step is performed at pH 0.8 to pH 2.0. In this manner, the ξ potential can be applied favorably.

In a different preferred embodiment, the grain size of the colloidal silica used in the precision polishing step is 80 nm or less, and is substantially within a range of 10 nm to 80 nm.

In another different preferred embodiment, the production method uses at least two types of polishing material, and the polishing materials are respectively used in separate double-sided polishing machines.

The glass substrate for an information recording medium of the present invention is produced in accordance with the foregoing method of producing a glass substrate for an information recording medium.

This application relates to and claims priority from Japanese Patent Application No. 2010-75325, filed on Mar. 29, 2010, the entire disclosure of which is incorporated herein by reference.

While the present invention was appropriately and sufficiently explained above based on the embodiments with reference to the drawings in order to represent the present invention, it should be recognized that a person skilled in the art can easily modify and/or improve the foregoing embodiment. Accordingly, so as long as the modified mode or improved mode implemented by a person skilled in the art does not deviate from the scope of claims indicated in the claims, such modified mode or improved mode should be interpreted as being covered by the present scope of claims.

The invention claimed is:

1. A method of producing a glass substrate for an information recording medium, comprising:
    a precision polishing step of performing a precision polishing under acidic conditions on a glass material in which, prior to precision polishing, iron is adhered on a surface of the glass material and is present in an amount of 0.5 ng/cm$^2$ or less and a surface roughness Ra of the glass material is 1 nm or less, cyclically using a polishing solution containing a polishing material, the polishing material containing colloidal silica.

2. The method of producing a glass substrate for an information recording medium according to claim 1, wherein the precision polishing step is performed at pH 0.8 to pH 2.0.

3. The method of producing a glass substrate for an information recording medium according to claim 1, wherein a grain size of the colloidal silica used in the precision polishing step is 80 nm or less.

4. The method of producing a glass substrate for an information recording medium according to claim 1, wherein the production method uses at least two types of polishing material, and polishing materials are respectively used in separate double-sided polishing machines.

5. The method of claim 1, further comprising using the precision polishing solution five or more times to precision polish glass materials under acidic conditions, in which, prior to precision polishing each glass material, iron is adhered on a surface of each glass material and is present in an amount of 0.5 ng/cm$^2$ or less and a surface roughness Ra of each glass material is 1 nm or less;
    wherein the surface roughness Ra of the glass materials after precision polishing with five uses of the precision polishing solution is less than 0.15 nm.

6. The method of claim 5, wherein the surface roughness Ra of the glass materials after precision polishing with five uses of the precision polishing solution is 0.03 nm or more and less than 0.15 nm.

7. The method of claim 5, wherein the grain size of the colloidal silica is 20 nm or more.

* * * * *